US009391776B2

(12) United States Patent
Salomone

(10) Patent No.: US 9,391,776 B2

(45) **Date of Patent: *Jul. 12, 2016**

(54) METHOD AND SYSTEM FOR AUTHENTICATING PEER DEVICES USING EAP

(71) Applicant: BlackBerry Limited, Waterloo (CA)

(72) Inventor: Leonardo Jose Silva Salomone, Arnprior (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/460,978

(22) Filed: Aug. 15, 2014

(65) Prior Publication Data

US 2014/0359279 A1 Dec. 4, 2014

Related U.S. Application Data

(63) Continuation of application No. 13/692,137, filed on Dec. 3, 2012, now Pat. No. 8,850,202, which is a continuation of application No. 11/673,013, filed on Feb. 9, 2007, now Pat. No. 8,356,176.

(51) Int. Cl.

*H04L 9/32* (2006.01)
*H04L 29/06* (2006.01)

(52) U.S. Cl.

CPC .............. *H04L 9/321* (2013.01); *H04L 9/3202* (2013.01); *H04L 63/068* (2013.01); *H04L 63/08* (2013.01); *H04L 63/162* (2013.01)

(58) Field of Classification Search

CPC ........ H04L 9/321; H04L 63/08; H04L 63/162
USPC .............................. 713/168; 709/227; 726/17
See application file for complete search history.

(56) References Cited

PUBLICATIONS

RFC2284 (1998). PPP Extensible Authentication Protocol. Retrieved Aug. 11, 2015 from http://tools.ietf.org/html/rfc2284.*

* cited by examiner

*Primary Examiner* — Brian Shaw
(74) *Attorney, Agent, or Firm* — Ridout & Maybee LLP

(57) ABSTRACT

A system and method for authenticating a peer device onto a network using Extensible Authentication Protocol (EAP). The key lifetime associated with the keying material generated in the peer device and the authentication server is communicated from the authenticator to the peer device within the EAP Success message. The peer device, having been provided with the key lifetime, can anticipate the termination of its authenticated session and initiate re-authentication prior to expiry of the key lifetime.

17 Claims, 3 Drawing Sheets

METHOD AND SYSTEM FOR AUTHENTICATING PEER DEVICES USING EAP

CROSS-REFERENCE TO RELATED APPLICATIONS

This application is a continuation application of U.S. patent application Ser. No. 13/692,137, filed on Dec. 3, 2012, which is a continuation of patent application Ser. No. 11/673,013, filed on Feb. 9, 2007, which has been issued a U.S. Pat. No. 8,356,176 on Jan. 15, 2013, the contents of which are hereby incorporated by reference.

FIELD

Example embodiments described herein relate to wireless communications networks and, in particular, to network access authentication.

BACKGROUND

In conventional networks, such as wireless networks, peer devices need to be authenticated before they are permitted access to the network. A number of standards have developed to govern the authentication of peer devices and to control access to networks. For example, IEEE standard 802.11i defines certain security protocols for wireless network access and authentication, and IEEE 802.1X provides a port-based authentication framework for 802 LANs, and, in particular, wireless local area networks (WLANs) that conform to the IEEE 802.11 standard. IEEE 802.1X can be implemented using a standard authentication protocol framework, such as the Extensible Authentication Protocol (EAP) defined in RFC 3748.

EAP defines an authentication framework rather than the actual authentication method. Within EAP, there are a number of methods/mechanisms that may be employed to conduct the authentication exchange. These may be referred to as EAP-specific authentication methods or mechanisms. Examples include EAP-TLS, EAP-SIM, EAP-AKA, PEAP, LEAP and EAP-TTLS.

During an EAP-specific authentication exchange, master session keys (MSKs) are generated by the peer and the server. At the server-side, an associated key lifetime is also generated. The MSKs may be later used to derive additional keys, including transient session keys (TSKs)—also called pairwise transient keys (PTKs). These derived PTKs or TSKs will share the same key lifetime limitations of the MSKs. If the EAP authentication exchange is successful, an EAP success message is sent from the server to the peer, often via an intermediary authenticator associated with the access port.

When the PTK or TSK lifetime expires, the authenticator must de-authenticate the peer device from the network. The peer device is required to repeat the authentication process. This de-authentication, and consequent disconnection from the access point, may be highly undesirable if the peer device is engaged in an active session. For example, in voice-over-IP (VoIP) and other such communication applications, the disconnection may result in dropped phone calls. In other applications, media sessions may be disrupted and data packets may be lost as a result of the disconnection.

Accordingly, it would be advantageous to provide an improved method and system for peer device authentication.

BRIEF DESCRIPTION OF THE DRAWINGS

Example embodiments will now be described by way of example with reference to the accompanying drawings, through which like reference numerals are used to indicate similar features.

DETAILED DESCRIPTION

Figure 1:
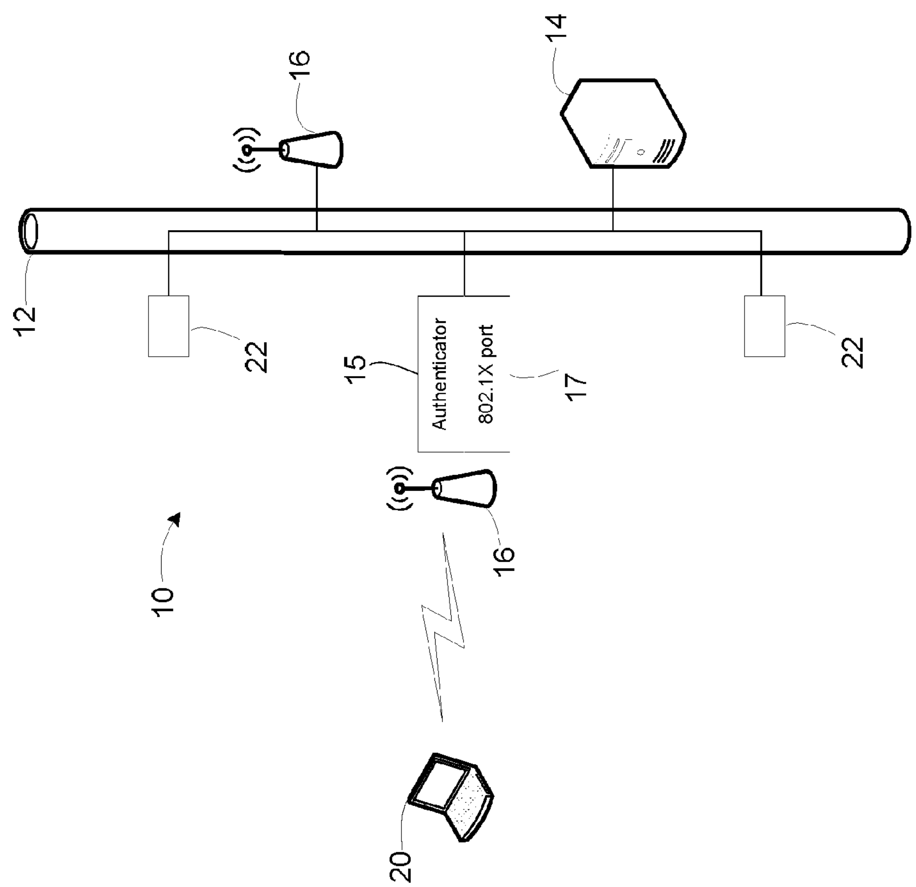
FIG. 1 shows a diagrammatic view of an example wireless local area network system to which example embodiments can be applied.

At least one example embodiment includes a method for network authentication of a peer onto a wireless network having an authenticator and an authentication server, the network being accessible through the authenticator. The method includes performing an authentication exchange between the peer and the server, generating a session time in the server, and communicating the session time to the authenticator, and communicating a success message from the authenticator to the peer, wherein the success message includes a session timeout value including a key lifetime.

At least one example embodiment includes a network authentication system, comprising a peer to be authenticated onto a wireless network, an authenticator coupled to the network, and an authentication server coupled to the network. The peer and the server are configured to perform an authentication phase, the server is configured to generate a session time and communicate the session time to the authenticator, and the authenticator is configured to communicate a success message to the peer, wherein the success message includes a session timeout value including the session time.

In one aspect, the present application provides a method for authenticating a peer device onto a network having an authenticator and an authentication server, the authentication server supporting Extensible Authentication Protocol (EAP), the network being accessible through an access point associated with the authenticator. The method includes steps of exchanging EAP-specific authentication messages between the peer device and the authentication server via the authenticator, generating keying material in the peer device, generating the keying material and an associated key lifetime in the authentication server, and communicating the keying material and the associated key lifetime from the authentication server to the authenticator. It also includes steps of, communicating an EAP Success message from the authenticator to the peer device following the exchange of EAP-specific authentication messages, wherein the EAP Success message contains the associated key lifetime, and conducting a Secure Association Protocol (e.g., a 4-way handshake) to complete authentication and grant the peer device unblocked access to the network after communication of the EAP success message to the peer device.

In another aspect, the present application provides a communications system. The system includes a network having an access point, an authenticator associated with the access point, an authentication server connected to the network and configured to communicate with the authenticator, the authentication server being configured to support Extensible Authentication Protocol (EAP), and a peer device configured to connect to the access point and exchange EAP-specific authentication messages with the authentication server via the authenticator, the peer device being further configured to generate keying material. The authentication server is configured to generate the keying material and an associated key lifetime, and to communicate the keying material and the associated lifetime to the authenticator. The authenticator is configured to communicate an EAP Success message to the peer device following the exchange of EAP-specific authentication messages, and the EAP Success message contains the associated key lifetime. The peer device and the authenticator are configured to engage in a Secure Association Protocol to complete authentication and grant the peer device unblocked access to the network.

In yet a further aspect, the present application provides an access point in a network for permitting access by a peer device onto the network, the network including an authentication server supporting Extensible Authentication Protocol (EAP). The access point comprises an authenticator configured to exchange EAP-specific authentication messages between the authentication server and the peer device, and configured to receive keying material and an associated key lifetime from the authentication server. The authenticator includes a component for generating an EAP Success message and transmitting the EAP success message to the peer device following the exchange of EAP-specific authentication messages. The EAP Success message contains the associated key lifetime. The authenticator is further configured to engage in a Secure Association Protocol to complete authentication and grant the peer device unblocked access to the network.

In another aspect, the present application provides a method at an access point in a network for permitting access by a peer device onto the network, the network having an authentication server supporting Extensible Authentication Protocol (EAP). The method includes steps of exchanging EAP-specific authentication messages between the authentication server and the peer device, receiving keying material and an associated key lifetime from the authentication server, generating an EAP success message, and transmitting the EAP Success message to the peer device following the exchange of EAP-specific authentication messages, wherein the EAP Success message contains the associated key lifetime.

In yet a further aspect, the present application provides a computer readable medium containing program code executable by a processor of a computing device to configure the computing device to perform any of the methods described herein.

The following description of one or more specific embodiments does not limit the implementation of the invention to any particular computer programming language, operating system, system architecture or device architecture. Although some of the example embodiments discussed below relate to wireless networks or WLANs, the present application is not limited to wireless networks and applies to any network using the EAP framework for authentication of peer devices.

EAP is an authentication framework that typically runs over data link layers, for example IEEE 802.11, PPP, IKEv2 in VPNs, etc. Generally, EAP permits the use of a backend authentication server, which may implement some or all EAP-specific authentication methods, with an authenticator acting as a pass-through for some or all of the EAP-specific authentication messages. A framework for EAP is outlined in IETF Request for Comment (RFC) 3748, the contents of which are herein incorporated by reference.

Reference is now made to FIG. 1, which shows a diagrammatic view of an example embodiment of a wireless local area network system 10. An Ethernet-based backbone 12 is shown having a plurality of ports for connecting of a number of devices. As shown, the Ethernet 12 may have at least one access point 16. The system 10 includes a peer device 20 configured for wireless communication with one of the access points 16. In other embodiments, the peer device 20 may be configured for wired connection and communication to one of the access points 16 or other access points on the Ethernet 12. In some example embodiments, at least one access point 16 may implement an IEEE 802.1X port access entity (PAE) 17, for permitting access by the peer device 20 to the backbone 12. Authentication server 14 is shown connected the backbone 12 and is configured to provide an authentication service for authenticating the peer device 20. A number of other devices 22 may also be connected to the Ethernet 12 and may be configured for communication within the network system 10.

In some example embodiments, the peer device 20 may be any client device, including a computer terminal, a wireless mobile device, a personal digital assistant, or any other device configured to access the Ethernet 12 via one of the access points 16.

The port 17 may be switched from blocked to unblocked, either fully or partially, and vice-versa. When a device, such as peer device 20, is initially detected by the access point 16, the port 17 is thereby partially enabled and set to an "unauthorized" state. In this state, only 802.1X traffic will be allowed, and other traffic will be blocked, such as DHCP (Dynamic Host Configuration Protocol) and HTTP (Hypertext Transfer Protocol). If there is successful authentication of the peer device 20, then the port 17 becomes unblocked.

In some example embodiments, as illustrated in FIG. 1, the access point 16 includes or is associated with an authenticator 15. In other example embodiments, the authenticator 15 may be separate from the access point 16. As will be described in greater detail below, the authenticator 15 facilitates authentication of the peer device 20 within the network system 10. In some example embodiments, the authenticator 15 acts as a pass-through between the authentication server 14 and the peer device 20.

In at least some example embodiments, authentication server 14 may be implemented by any suitable server device, for example a controller having installed thereon suitable executable applications. For example, authentication server 14 may be configured with Remote Authentication Dial in User Service (RADIUS), as is known in the art. Generally, the RADIUS server determines whether the peer device 20 is acceptable for authentication using designated or specified protocols. If accepted, the RADIUS server will then authorize access of the peer device 20 to the Ethernet 12 by sending an EAP success message to the authenticator 15. In other example embodiments, authentication server 14 may be configured with Diameter (which may for example be used to perform a DIAM-EAP protocol), as is known in the art. Other example implementations of the authentication server 14 will be appreciated by those ordinarily skilled in the art.

Figure 2:
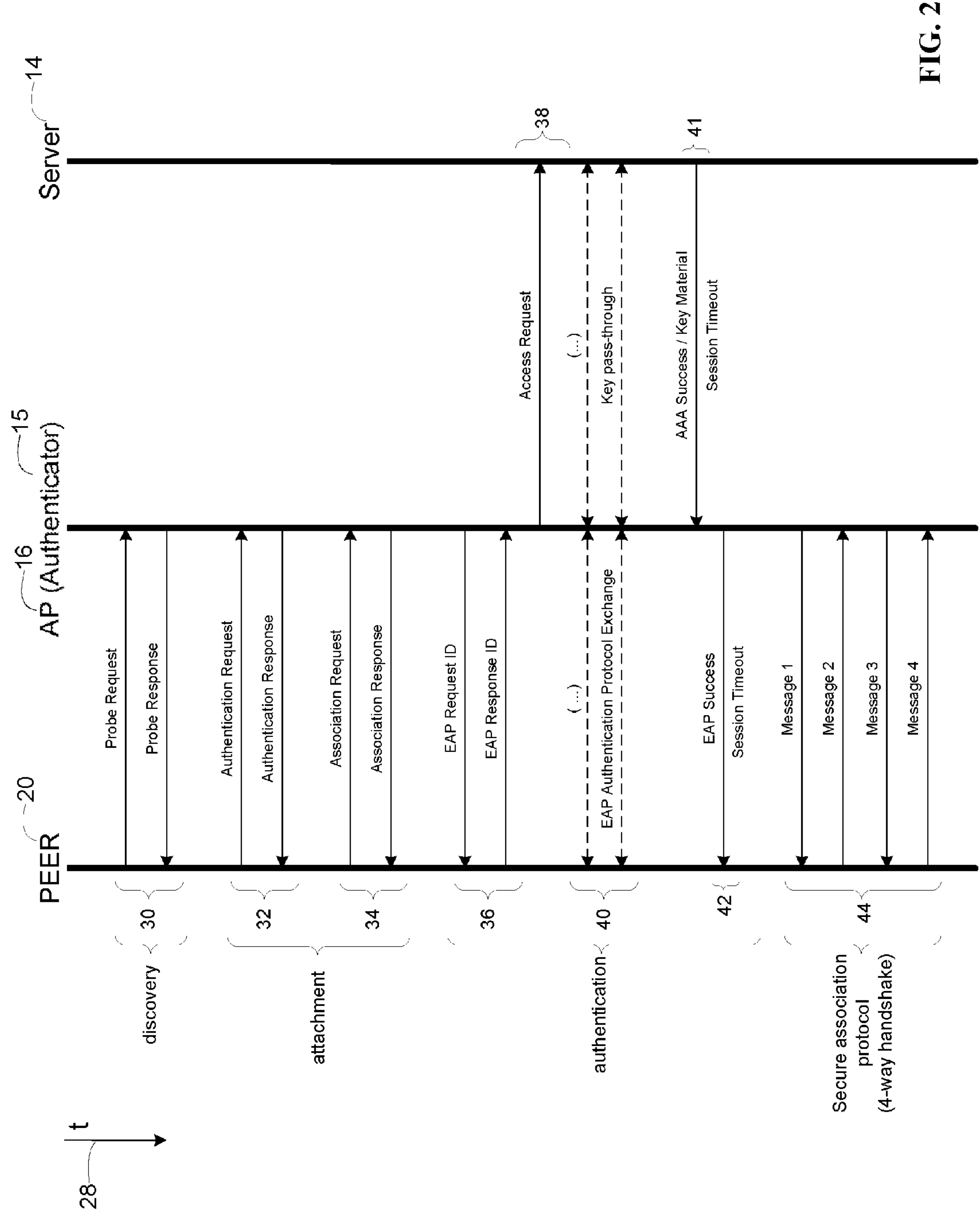
FIG. 2 shows, in diagrammatic form, an exemplary embodiment of a network authentication conversation between a peer, an authenticator, and an authentication server, as applied to the system of FIG. 1.

Reference is now made to FIG. 2, which shows an exemplary embodiment of a network authentication conversation between the peer device 20, the access point 16, and the authentication server 14, as applied to the system of FIG. 1. Generally, a one-sided arrow denotes a unidirectional data transfer from one device to another, while a two-sided arrow denotes a bidirectional data transfer or data exchange between devices. The conversation may be performed chronologically, as indicated by a time arrow 28.

In some example embodiments, it is assumed that the authenticator 15 and the authentication server 14 have established a secure channel over the Ethernet 12, for example using IEEE 802.1X, as is known in the art.

In some example embodiments, the conversation includes a discovery phase, an attachment phase, an authentication phase, and a secure association protocol phase, which is often referred to as a 4-way handshake. The discovery phase may include a probe request and probe response 30. The attachment phase may include an authentication request and authentication response 32, and an association request and association response 34. The authentication phase may include an EAP Request Identity and EAP Response Identity 36, an access request 38, an EAP-specific authentication exchange 40 and an AAA Success Message 41 and EAP Success Message 42. The secure association protocol phase includes a 4-way handshake 44, for example as defined in IEEE 802.11i.

The discovery phase and attachment phase may take place between the peer device 20 and the access point 16. The discovery phase and attachment phase is generally external to any EAP protocols. In the discovery phase, the peer device 20 actively locates any access points 16 for access to the particular network associated with those access points 16. In some example embodiments, the discovery phase is performed either manually or automatically. Each step of the discovery phase and subsequent attachment phase may include a data frame, in accordance with the appropriate protocol. For some embodiments, the discovery phase and attachment phase is outlined in IEEE 802.11.

The probe request and response step 30 is an active process by which the peer device 20 actively discovers the security policy of the access point 16. The peer device 20 sends a probe request to the access point 16. If the probe request is acknowledged, the access point 16 sends a probe response back to the peer device 20. The probe request data frame may for example include service set identifier (SSID) and supported rates. The probe response data frame may for example include a timestamp, beacon interval, capability information, SSID, supported rates and security parameters.

The authentication request and response step 32 is exchanged once the probe step 30 is successful. Successful authentication permits further specified data exchange, for example the association step 34. The authentication data frame may for example include the authentication algorithm number, authentication transaction sequence number, status code, and challenge text.

The association request and response step 34 is exchanged once the authentication step 32 is successful. Successful association permits further specified data exchange such as data frames, management frames, and control frame. The association request data frame may for example include capability information, listen interval, SSID, and supported rates. The association response data frame may for example include capability information, status codes, association ID, and supported rates.

The authentication phase may be initiated on successful conclusion of the attachment phase. The authentication phase may start with EAP Request Identity and EAP Response Identity 36. This may be in the form of an EAP packet. An exemplary EAP packet format is structured as follows: code, identifier, length, and data. There may be four types of codes: 1) Request, 2) Response, 3) Success, and 4) Failure. The identifier assists in matching responses with requests. The length field indicates the length of the EAP packet. The data field may be zero or more octets, and the format may vary depending on the code field.

After successful completion of EAP Request Identity and EAP Response Identity 36, the authenticator 15 sends an access request 38 to the authentication server 14. In response, the authenticator initiates an EAP-specific authentication exchange 40 with the peer device 20. The EAP authentication exchange 40 depends on the type of EAP protocol used. The EAP authentication protocol may for example be EAP-PEAP, EAP-TLS, EAP-SIM, etc.

During the authentication phase, keying material is generated on both the peer device 20 and the authentication server 14. In some embodiments, the keying material is generated as a part of the EAP-specified authentication exchange 40. In embodiments in which the system includes the backend authentication server 14, there is a key transport step of communicating the keying material from the authentication server 14 to the authenticator 15 during the authentication phase. A proposed key management framework for EAP is described in IETF draft document draft-ietf-eap-keying-14.txt, Jun. 25, 2006 (hereinafter "KMF-EAP"), the contents of which is hereby incorporated by reference. As described in KMF-EAP, the keying material may include a Master Session Key (MSK), which is sometimes referred to as an AAA-Key (Authentication, Authorization and Accounting). The MSK is derived at both the peer device 20 and at the authentication server 14. The authentication server 14 communicates the MSK to the authenticator 15 during the authentication phase. Following the authentication phase, the MSK may be used by the peer device 20 and the authenticator 15 to generate further keys, including a pairwise master key (PMK) and transient session keys (TSKs).

If the authentication protocol exchange 40 is successful, the authentication server 14 sends an AAA success message 41 to the authenticator 15 to indicate that the peer device 20 has been authenticated by the authentication server 14. The keying material, such as the MSK, may be sent to the authenticator 15 at this time. It may be included in the AAA success message 41 or sent in a separate message. The authentication server 14 may also send the authenticator 15 the associated key lifetime for the keying material. In some example embodiments, the key lifetime is a default value, for example eight hours. The key lifetime may also be referred to as a session timeout value, which indicates the maximum session time before re-authentication of the peer device 20 will be required.

The authenticator 15 then generates and transmits an EAP success message 42 to the peer device 20. The EAP success message 42 may be structured in the format of an EAP packet. The authenticator 15 also transmits the key lifetime to the peer device 20. In one embodiment, the key lifetime is contained within the EAP Success Message 42. For example, the key lifetime may be contained within the data field of the success packet. Section 4.2 of the defining EAP document, RFC 3748, forbids the inclusion of any data in the data portion of an EAP success packet. Accordingly, embodiments of the present application will not conform to RFC 3748 unless the standard is modified to permit such data in the success packet.

Following receipt of the EAP success message 42, the peer device 20 is in possession of the key lifetime associated with the MSK generated at the peer device 20. The peer device 20 may, therefore, accurately predict the time by which it must re-authenticate to avoid an abrupt de-authentication and possible disconnection.

Following the authentication phase, the peer device 20 and authenticator 15 perform the Secure Association Protocol, which in the case of 802.11i is termed a 4-way handshake, as is known in the art. The 4-way handshake enables the authenticator 15 and the peer device 20 to establish secure associations with each other. Successful completion of the 4-way handshake causes the IEEE 802.1X port 17 (in access point 16) to become unblocked and to permit general data traffic. The successful completion of the Secure Association Protocol further results in the generation or derivation of Transient Session Keys (TSKs) known to the peer device 20 and the authenticator 15.

A de-authentication step may also be performed by the authenticator 15. De-authentication wholly or partially disconnects the peer device 20 from the system 10. The IEEE 802.1X port 17 becomes blocked and no longer permits certain data exchanges with the peer device 20. For example, in some embodiments, the port 17 may still permit 802.1X traffic but block other traffic (such as DHCP and HTTP). De-authentication requires the peer device 20 to once again perform the authentication phase (and discovery phase and attachment, if necessary). The re-authentication of the peer device 20 using the above-described process, results in the generation of new keying material having a new associated key lifetime, after which the peer device 20 can be granted authenticated access to the network 12.

In some example embodiments, the system 10 may permit pre-authentication of the peer device 20. In such embodiments, the peer device 20 pre-establishes the EAP keying material with an authenticator 15 prior to actually attaching to it. Thus, at a later time, the 4-way handshake 44 may be performed with the key already established in order to re-establish an authenticated session. The pre-authentication is performed in a similar manner as the authentication as described above. Accordingly, in some embodiments, a difference is that there would be a delay between the re-authentication, e.g. the EAP success message 42, and the 4-way handshake 44.

It can be appreciated that some or all of the above steps may or may not be necessary for operation of particular embodiments of the system 10. For example, the discovery phase may not be necessary when the peer device 20 and access point 16 have already discovered each other.

It will also be appreciated that the transmission of the key lifetime from the authenticator 15 to the peer device 20 enables the peer device 20 to anticipate the expiry of its session. Therefore, the peer device 20 can take active steps to ensure the session does not expire in the midst of an active media session, like a VoIP call. The peer device 20 may initiate re-authentication prior to expiry of the session based on its knowledge of the key lifetime.

By incorporating the key lifetime communication into the EAP Success Message 42, the present application avoids having to modify every EAP-specific method so as to communicate the key lifetime during the EAP-specific authentication exchange 40. It also avoids having to communicate the key lifetime during the Secure Association Protocol, e.g. the 4-way exchange.

Figure 3:
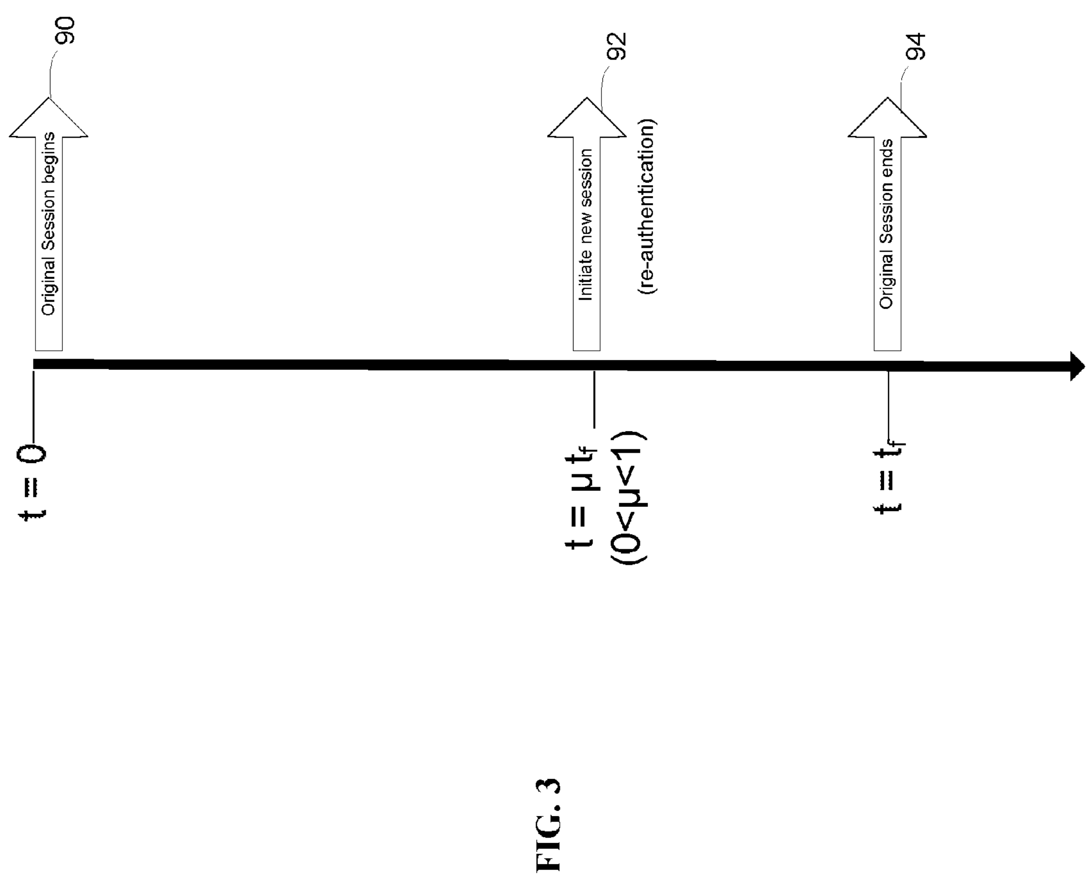
FIG. 3 shows an example timeline for initiating a new authentication session prior to an expiration of an original session, as applied to the system of FIG. 1.

Reference is now made to FIG. 3, which illustrates an exemplary timeline of a network authentication session between the peer device 20 and the authenticator 15. An original network session 90 may be initiated, for example at time zero (t=0). The original network session 90 may for example be initiated after the 4-way handshake 44 is successful and the port 17 is unblocked. In some example embodiments, after the session timeout value expires (denoted by $t=t_f$), the original session ends 94. At this point, the authenticator 15 may perform deauthentication of the peer device 20, thereby wholly or partially disconnecting the peer device 20. After which, a new session must be initiated by the peer device 20, for example by re-initiating the authentication phase (or the discovery phase and attachment, as appropriate).

In other example embodiments, referring again to FIG. 3, the peer device 20 may initiate a new session 92 before the original session ends 94. Since the peer device 20 was informed of the key lifetime value when it received the EAP Success Message 42, the peer device 20 may select an appropriate time before the original session ends 94 at which to establish authentication for a new session 92. The time for initiating re-authentication may be selected by the peer device 20 based upon a percentage of the key lifetime. The percentage may be a fixed or variable value, and is denoted as p. Thus, for example, if the key lifetime is 8 hours, an appropriate time to reinitiate authentication may be 6 hours, meaning p would be set to 0.75. By way of example only, other suitable values for p may range from 0.5 to 0.99. Theoretically, p may range anywhere from 0 to 1. In some embodiment, the re-authentication time may be set to a fixed time prior to expiry of the key lifetime, such as, for example, 30 minutes. It will be appreciated that other suitable fixed times may be used.

In some embodiments, the peer device 20 may attempt to ensure that no active media sessions or services are disrupted as a result of the re-authentication process. Accordingly, the peer device 20 may, in some example embodiments, wait to re-authenticate until the peer device 20 is momentarily idle. In some example embodiments, if the peer device 20 is for example configured for voice-over IP call applications, if a user initiates a voice-over call on the peer device 20, the peer device 20 may advise the user the remaining time in the existing session. For example, once the time for re-authentication is reached, the peer device 20 may test to determine if there are any active services or sessions over the communications link. If so, then the peer device 10 may wait until the service or session ends before re-authenticating.

In some example embodiments, during the step of initiating a new session 92, the peer device 20 performs re-authentication, i.e., re-establishes the EAP keying material with an authenticator 15. This may be accomplished by performing a step similar to the EAP authentication protocol exchange 40, and any of the other preceding steps, where necessary. Accordingly, before the original session ends 94, the peer device 20 has already established the appropriate key and needs only complete the 4-way handshake 44 for re-authentication.

In some example embodiments, the peer device 20 may be configured to switch on or off the option of initiating the new session 92 before the original session ends 94. Accordingly, a user of peer device 20 may be able to set or configure the desired option.

In some embodiments, the user of peer device 20 may also set the default p values and/or manually set the p values at the beginning of each session. Similarly, in some example embodiments, the access point (or authenticator 15) may be configured to switch on or off the option of initiating a new session 92.

In some example embodiments, the peer device 20 may display a timer on a display screen (not shown), displaying or counting down the amount of time remaining in the original network session. Thus, the user of the peer device 20 is continuously or intermittently informed of the remaining session time. The user may act accordingly before the original network session ends 94. For example, the user may choose not to start a voice-over call or not initiate any new data transfers. In some example embodiments, there may also be a manual user selectable option on the peer device 20, wherein, upon selection by a user of the peer device 20, a new session 92 with the authenticator 15 is initiated.

The above description is not intended to be limited to IEEE 802.11i. Rather, example embodiments of the present invention may be applied to other network protocols, including those that use EAP. Accordingly, the system may, for example, be applied to EAP over Point-To-Point Protocol (PPP), EAP over IKEv2, and others.

While the invention has been described in detail in the foregoing specification, it will be understood by those skilled in the art that variations may be made without departing from the scope of the invention, being limited only by the appended claims.

What is claimed is:

1. A method for authenticating a peer device onto a network having an authenticator and an authentication server, the authentication server supporting modifications to Extensible Authentication Protocol (EAP), the network being accessible through an access point associated with the authenticator, the method including steps of:

exchanging EAP-specific authentication messages between the peer device and the authentication server via the authenticator;

generating keying material in the peer device, wherein the authentication server generates said keying material and an associated key lifetime in the authentication server, and communicates said keying material and said associated key lifetime from the authentication server to the authenticator;

receiving an EAP Success packet from the authenticator to the peer device following the exchange of EAP-specific authentication messages, wherein the EAP Success packet comprises a code field set to Success, and wherein the EAP Success packet exclusively contains said associated key lifetime, to complete authentication to grant the peer device unblocked access to the network;

conducting a 4-way handshake, without receiving the associated key lifetime during the 4-way handshake, to complete said authentication and grant the peer device unblocked access to the network after communication of the EAP Success packet to the peer device; and establishing re-authentication with the authentication server via the authenticator, at a time which is a fixed time interval prior to session timeout of the associated key lifetime as selected by a user of the peer device, including generating second keying material; and responsive to determining no active media sessions are disrupted as a result of the re-authentication, completing the re-authentication with the second keying material.

2. The method of claim 1, wherein the peer device is configured to operate in accordance with at least one of IEEE 802.11 standards, Point-To-Point Protocol (PPP), or IKEv2.

3. The method of claim 1, wherein said keying material comprises a master session key (MSK), and wherein the 4-way handshake includes deriving a pairwise master key (PMK) from the MSK, and generating a transient session key (TSK) from the PMK, and wherein the TSK is used for encrypting subsequent communications between the peer device and the access point.

4. The method of claim 3, wherein the key lifetime associated with the MSK is associated with each key derived from the MSK, including the PMK and TSK.

5. The method of claim 1, wherein the EAP Success packet is modified so that a data field contains said associated key lifetime.

6. The method of claim 1, wherein the access point is configured to implement 802.1X for permitting access to the network by the peer device.

7. The method of claim 1, wherein the network includes an Ethernet-based network and the access point provides access to the Ethernet-based network upon said completion of said authentication.

8. The method of claim 1, wherein the EAP Success packet comprises the code field set to 3 (Success).

9. A peer device for communicating with a communications system including a network having an access point, an authenticator associated with the access point, and an authentication server connected to the network and configured to communicate with the authenticator, the authentication server being configured to support modifications to Extensible Authentication Protocol (EAP), the peer device comprising:

a processor configured to connect to said access point and exchange EAP-specific authentication messages with the authentication server via the authenticator, and configured to generate keying material, wherein the authentication server is configured to generate said keying material and an associated key lifetime, and to communicate said keying material and said associated lifetime to the authenticator;

the processor further configured to:

receive an EAP Success packet to the peer device following the exchange of EAP-specific authentication messages, wherein the EAP Success packet comprises a code field set to Success, and wherein the EAP Success packet exclusively contains said associated key lifetime, to complete authentication to grant the peer device unblocked access to the network, conduct a 4-way handshake, without receiving the associated key lifetime during the 4-way handshake, to complete said authentication and grant the peer device unblocked access to the network after communication of the EAP Success packet to the peer device, and establish re-authentication with the authentication server via the authenticator at a time which is a fixed time interval prior to session timeout of the associated key lifetime as selected by a user of the peer device, including generating second keying material; and responsive to determining no active media sessions are disrupted as a result of the re-authentication, completing the re-authentication with the second keying material.

10. The peer device of claim 9, wherein the processor is configured to operate in accordance with at least one of IEEE 802.11 standards, Point-To-Point Protocol (PPP), or IKEv2.

11. The peer device of claim 9, wherein said keying material comprises a master session key (MSK), and wherein the 4-way handshake includes deriving a pairwise master key (PMK) from the MSK, and generating a transient session key (TSK) from the PMK, and wherein the TSK is used for encrypting subsequent communications between the peer device and the access point.

12. The peer device of claim 11, wherein the key lifetime associated with the MSK is associated with each key derived from the MSK, including the PMK and TSK.

13. The peer device of claim 9, wherein the EAP Success packet is modified so that a data field contains said associated key lifetime.

14. The peer device of claim 9, wherein the authenticator is configured to implement 802.1X for permitting access to the network by the peer device.

15. The peer device of claim 9, wherein the EAP Success packet comprises the code field set to 3 (Success).

16. A non-transitory computer readable medium comprising program code executable by a processor of a peer device for authenticating the peer device onto a network having an authenticator and an authentication server, the authentication server supporting modifications to Extensible Authentication Protocol (EAP), the network being accessible through an access point associated with the authenticator, the code comprising:

computer executable instructions for exchanging EAP-specific authentication messages between the peer device and the authentication server via the authenticator;

computer executable instructions for generating keying material in the peer device, wherein the authentication server generates said keying material and an associated key lifetime in the authentication server, and communicates said keying material and said associated key lifetime from the authentication server to the authenticator;

computer executable instructions for receiving an EAP Success packet from the authenticator to the peer device following the exchange of EAP-specific authentication messages, wherein the EAP Success packet comprises a code field set to Success, and wherein the EAP Success packet exclusively contains said associated key lifetime, to complete authentication to grant the peer device unblocked access to the network; and computer executable instructions for conducting a 4-way handshake, without receiving the associated key lifetime during the 4-way handshake, to complete said authentication and grant the peer device unblocked access to the network after communication of the EAP Success packet to the peer device; and computer executable instructions for establishing re-authentication with the authentication server via the authenticator at a time which is a fixed time interval prior to session timeout of the associated key lifetime as selected by a user of the peer device, including generating second keying material; and responsive to determining no active media sessions are disrupted as a result of the re-authentication, completing the re-authentication with the second keying material.

17. The non-transitory computer readable medium of claim 16, wherein the EAP Success packet comprises the code field set to 3 (Success).

* * * * *